(12) United States Patent
Nakai et al.

(10) Patent No.: US 8,687,105 B2
(45) Date of Patent: Apr. 1, 2014

(54) IMAGE CAPTURING APPARATUS, IMAGE CAPTURING METHOD, AND RECORDING MEDIUM INCLUDING A FOCAL LENGTH ADJUSTMENT UNIT

(75) Inventors: Takehiro Nakai, Kawasaki (JP); Akifumi Izumisawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 426 days.

(21) Appl. No.: 13/044,913

(22) Filed: Mar. 10, 2011

(65) Prior Publication Data
US 2011/0221923 A1    Sep. 15, 2011

(30) Foreign Application Priority Data

Mar. 12, 2010   (JP) .................................. 2010-056589

(51) Int. Cl.
*H04N 5/232*    (2006.01)
*G03B 13/00*    (2006.01)
*G03B 13/36*    (2006.01)

(52) U.S. Cl.
CPC ............ *H04N 5/23212* (2013.01); *G03B 13/36* (2013.01)
USPC ........................................ 348/345; 348/208.2

(58) Field of Classification Search
USPC ..................... 348/208.1–208.16, 208.99, 345
See application file for complete search history.

(56) References Cited

U.S. PATENT DOCUMENTS

| 8,322,622 B2* | 12/2012 | Liu ........................ 235/462.48 |
| 2002/0102966 A1* | 8/2002 | Lev et al. ....................... 455/412 |
| 2007/0296845 A1* | 12/2007 | Watanabe et al. ......... 348/333.12 |
| 2008/0180536 A1* | 7/2008 | Nakahara ................. 348/208.99 |
| 2009/0027510 A1* | 1/2009 | Yumiki ...................... 348/222.1 |

FOREIGN PATENT DOCUMENTS

| JP | 2007-328626 A | 12/2007 |
| JP | 2009-230696 A | 10/2009 |
| JP | 2009-230696 A | 3/2011 |

* cited by examiner

*Primary Examiner* — Nelson D. Hernández Hernández
(74) *Attorney, Agent, or Firm* — Westerman, Hattori, Daniels & Adrian, LLP

(57) ABSTRACT

An image capturing apparatus includes an image capturing unit having a function for adjusting a focal length, a stillness determination unit which determines whether or not a motion of the image capturing apparatus is within a predetermined range, a focal length adjustment processing unit which performs first focal length adjustment processing which adjusts the focal length in a direction for close-up photography when the motion of the image capturing apparatus is within the predetermined range, and a code recognition processing unit which recognizes a code from an image captured by the image capturing unit while the first focal length adjustment processing is being performed.

7 Claims, 19 Drawing Sheets

IMAGE CAPTURING APPARATUS, IMAGE CAPTURING METHOD, AND RECORDING MEDIUM INCLUDING A FOCAL LENGTH ADJUSTMENT UNIT

CROSS-REFERENCE TO RELATED APPLICATIONS

This application is based upon and claims the benefit of priority of the prior Japanese Patent Application No. 2010-56589, filed on Mar. 12, 2010, the entire contents of which are incorporated herein by reference.

FIELD

The present invention relates to an image capturing apparatus, an image capturing method, and a recording medium.

BACKGROUND

In recent years, apparatuses in which a barcode reading function is added to an image capturing apparatus that captures pictures and moving images are proposed and commercialized. Such an image capturing apparatus having a barcode reading function can hold and record an image obtained from an image capturing unit as a picture or a moving image as well as recognize a code from an image obtained from the same image capturing unit.

As an example, a technique is known in which a barcode is attached to a part of a subject to be captured as a picture, the barcode portion in the captured image data is read, and the image data is managed.

Also, an image capturing apparatus is known in which a picture capturing function and a barcode reading function are installed as different functions and a user selects and starts either the picture capturing function or the barcode reading function.

These techniques are disclosed in Japanese Laid-open Patent Publication No. 2007-328626 and Japanese Laid-open Patent Publication No. 2009-230696.

SUMMARY

According to an aspect of an embodiment, an image capturing apparatus includes an image capturing unit having a function for adjusting a focal length, a stillness determination unit which determines whether or not a motion of the image capturing apparatus is within a predetermined range, a focal length adjustment processing unit which performs first focal length adjustment processing which adjusts the focal length in a direction for close-up photography when the motion of the image capturing apparatus is within the predetermined range, and a code recognition processing unit which recognizes a code from an image captured by the image capturing unit while the first focal length adjustment processing is being performed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a conventional technique, when the picture capturing function and the barcode reading function are different functions, and a user selects and starts either the picture capturing function or the barcode reading function, the operation is cumbersome.

When capturing a picture, usually, an image of a subject in a distance range between 1 m to infinity is captured. On the other hand, when reading a barcode, usually, the image of the barcode at a distance of about 10 cm is captured. Image capturing from a distance of about 10 cm is called close-up photography or macro photography.

In this way, the distance to the subject is different between capturing a picture and reading a barcode. Therefore, focusing cannot be performed by only adding a barcode reading operation to a normal camera. The focusing is an operation for adjusting a focal length of a lens system to a value suitable to a distance to the subject.

To solve the problem based on the difference between the subject distances for capturing a picture and reading a barcode, in a conventional technique, it is required for a user to perform an operation to switch the image capturing mode to the macro photography mode when performing the barcode reading. If a separate operation is required when reading a barcode as described above, even when a camera and the barcode reading function are integrated together, the merit thereof is small.

Hereinafter, an image capturing apparatus, an image capturing method, and a medium disclosed by this application will be described in detail with reference to the drawings. The specific embodiments described below do not limit the present invention.

First Embodiment

Configuration of Apparatus

Figure 1:
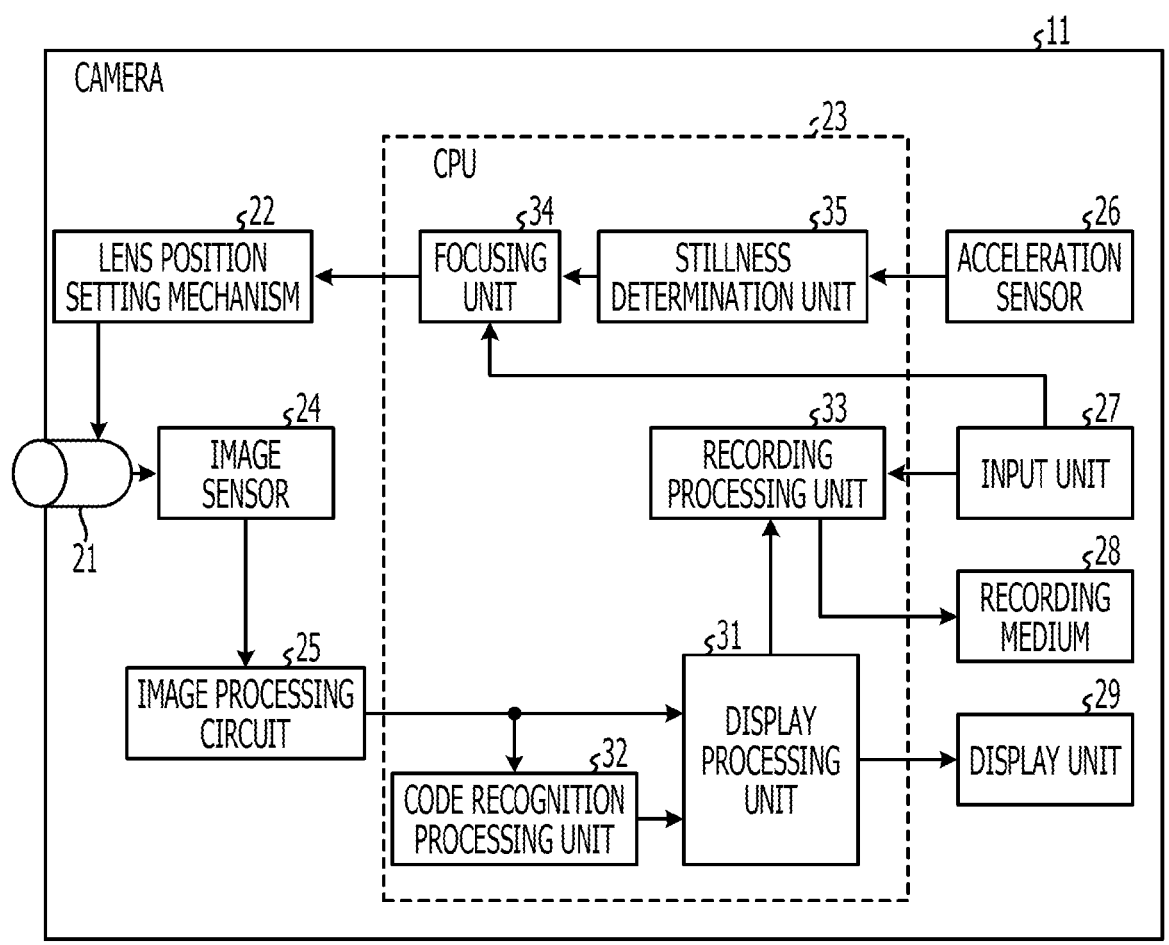
FIG. 1 is a configuration diagram of a camera that is an image capturing apparatus according to a first embodiment.

FIG. 1 is a configuration diagram of a camera 11 that is an image capturing apparatus according to a first embodiment. The camera 11 shown in FIG. 1 includes a lens 21, a lens position setting mechanism 22, a CPU (Central Processing Unit) 23, an image sensor 24, an image processing circuit 25, an acceleration sensor 26, an input unit 27, a recording medium 28, and a display unit 29.

The lens 21, the lens position setting mechanism 22, the image sensor 24, and the image processing circuit 25 function as an image capturing unit which can adjust a focal length. Specifically, the lens position setting mechanism 22 adjusts the focal length of the lens 21, and the image sensor 24 acquires an image of a subject obtained through the lens 21. The image processing circuit 25 processes an output of the image sensor 24 and outputs the processed result to the CPU 23 as image data.

The acceleration sensor 26 is a sensor for measuring accelerations applied to the camera 11 with respect to the X, Y, and Z axes, and outputs measurement results for the three axes to the CPU 23. The input unit 27 is a unit for receiving an operation input of a user, and a button, a key, a switch, and a touch panel can be used.

The recording medium 28 is used as a medium for holding images and moving images captured by the camera 11. The recording medium 28 can use arbitrary recording method, and for example, the recording medium 28 may be a static, a dynamic, a volatile, or a non-volatile memory, and may be a magnetic, an electrical, or an optical memory. The recording medium 28 may be a portable recording medium that can be removed from the camera 11. The display unit 29 is a unit for outputting and displaying a captured image, a recognition result of a code, and the like, and as an example, a liquid crystal display may be used.

In the camera 11, the CPU 23 functions as a display processing unit 31, a code recognition processing unit 32, a recording processing unit 33, a focusing unit 34, and a stillness determination unit 35. The display processing unit 31 is a processing unit for controlling contents displayed on the display unit 29. Specifically, the display processing unit 31 can output an image outputted from the image processing circuit 25, a result of the recognition processing by the code recognition processing unit 32, and the like to the display unit 29.

The code recognition processing unit 32 recognizes a code from an image outputted from the image processing circuit 25, and outputs a recognition result to the display processing unit 31 when the code can be recognized. In this way, an image outputted from the image processing circuit 25 is directly inputted in the display processing unit 31 for normal image capturing, and also inputted in the code recognition processing unit 32.

The recording processing unit 33 receives an instruction from the input unit 27 and records the image that is outputted from the image processing circuit 25 and obtained by the display processing unit 31. The image to be recorded may be temporarily held in a memory, which is not shown in the figures and used for operation of the CPU 23, or may be written into the recording medium 28.

The stillness determination unit 35 determines whether or not a motion of the camera 11 including the stillness determination unit 35 is within a predetermined range on the basis of an output of the acceleration sensor 26. The focusing unit 34 performs focusing by controlling the lens position setting mechanism 22.

When the focusing unit 34 receives an operation input of a user from the input unit 27, the focusing unit 34 performs focusing in accordance with the operation input. When the motion of the camera 11 is determined to be within the predetermined range by the stillness determination unit 35, the focusing unit 34 performs first focal length adjustment processing which adjusts the focal length in a close-up photography direction or to a macro photography side. The first focal length adjustment processing will be described later.

Figure 2:
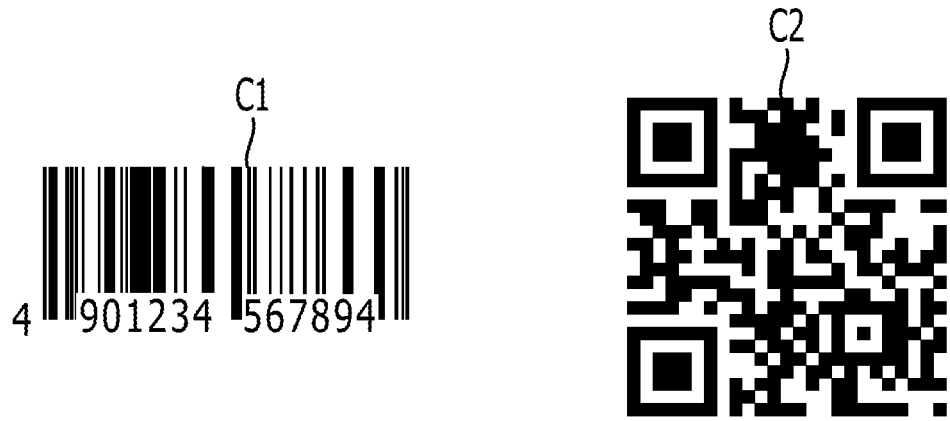
FIG. 2 is an illustration of codes recognized by a code recognition processing unit.

FIG. 2 is an illustration of codes recognized by the code recognition processing unit 32. The code C1 shown in FIG. 2 is a JAN (Japan Article Number) code, which is a so-called barcode, and the code C2 is a matrix type two-dimensional code, which is a so-called two-dimensional barcode. The code recognition processing unit 32 reads these codes and tries to recognize them, and outputs a recognition result to the display processing unit 31 when a code can be recognized.

Description of Comparative Configuration

Figure 3:
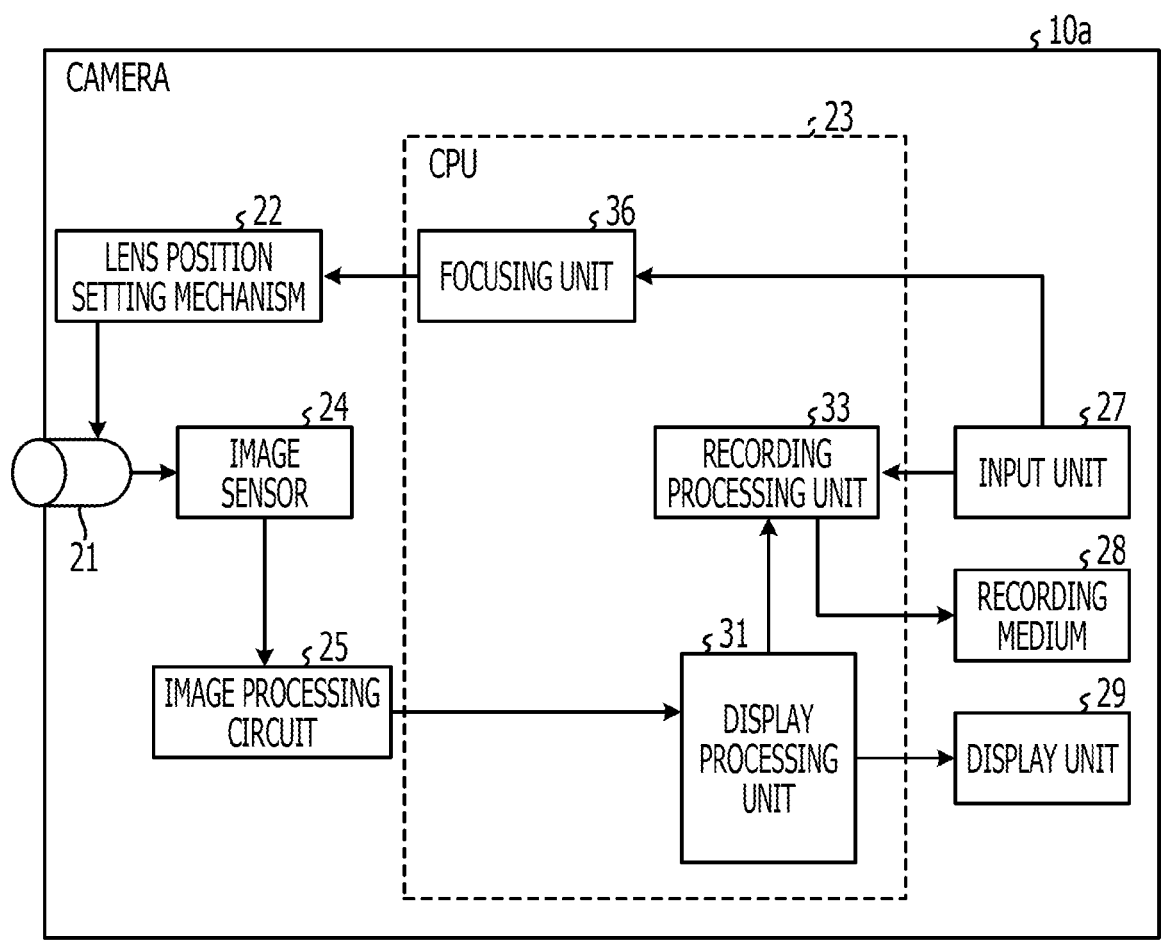
FIG. 3 is a configuration diagram of a comparative configuration that does not perform code recognition processing.

FIG. 3 is a configuration diagram of a comparative configuration that does not perform code recognition processing. When comparing a camera 10a shown in FIG. 3 with the camera 11 shown in FIG. 1, the camera 10a does not include the code recognition processing unit 32, the stillness determination unit 35, and the acceleration sensor 26, and the camera 10a only captures pictures. Therefore, a focusing unit 36 in the camera 10a performs focusing in accordance with an input from the input unit 27.

Figure 4:
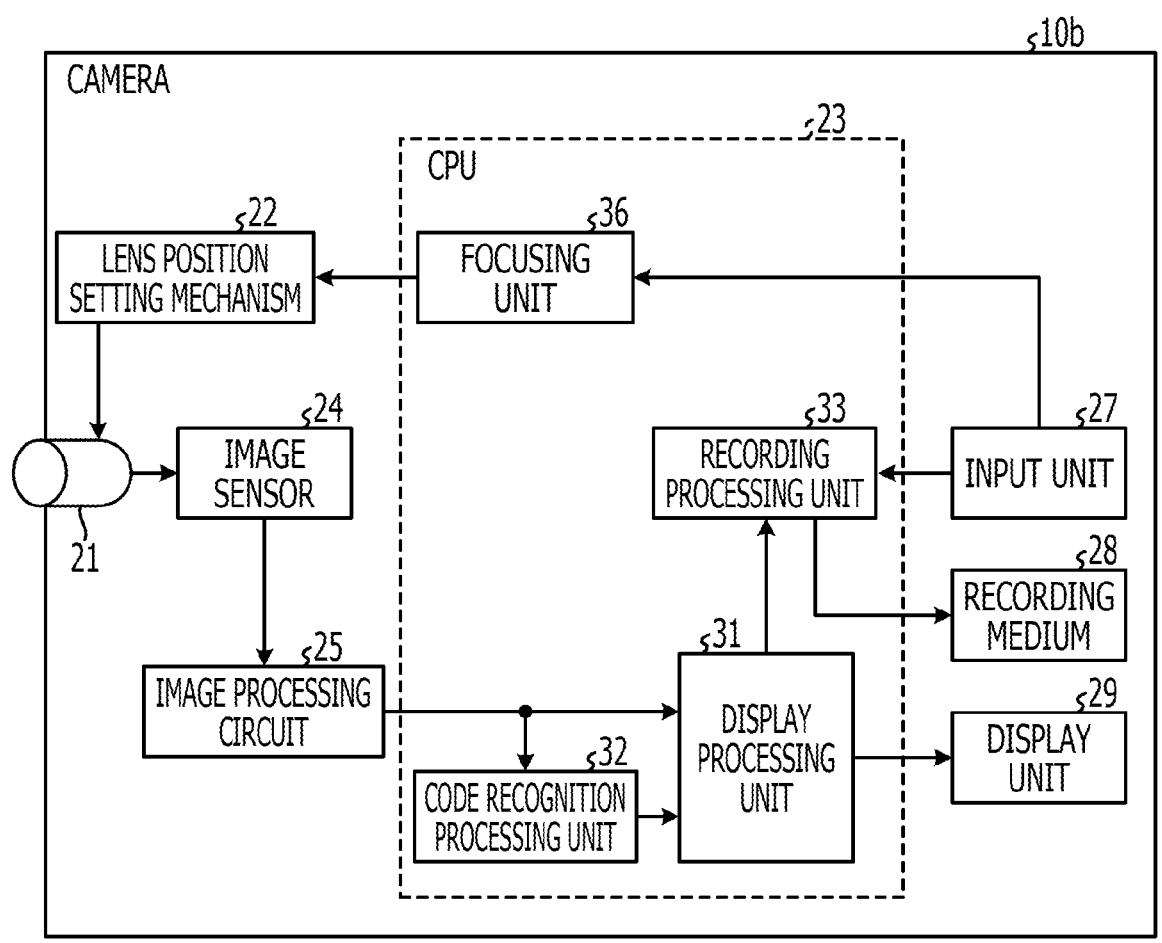
FIG. 4 is a configuration diagram of a comparative configuration in which a code recognition processing unit is added to the configuration of FIG. 3.

FIG. 4 is a configuration diagram of a comparative configuration in which the code recognition processing unit 32 is added to the configuration of FIG. 3. In a camera 10b shown in FIG. 4, an output of the image processing circuit 25 can be received by both the display processing unit 31 and the code recognition processing unit 32, and both the capturing of pictures and moving images and the code recognition can be performed.

Figure 5:
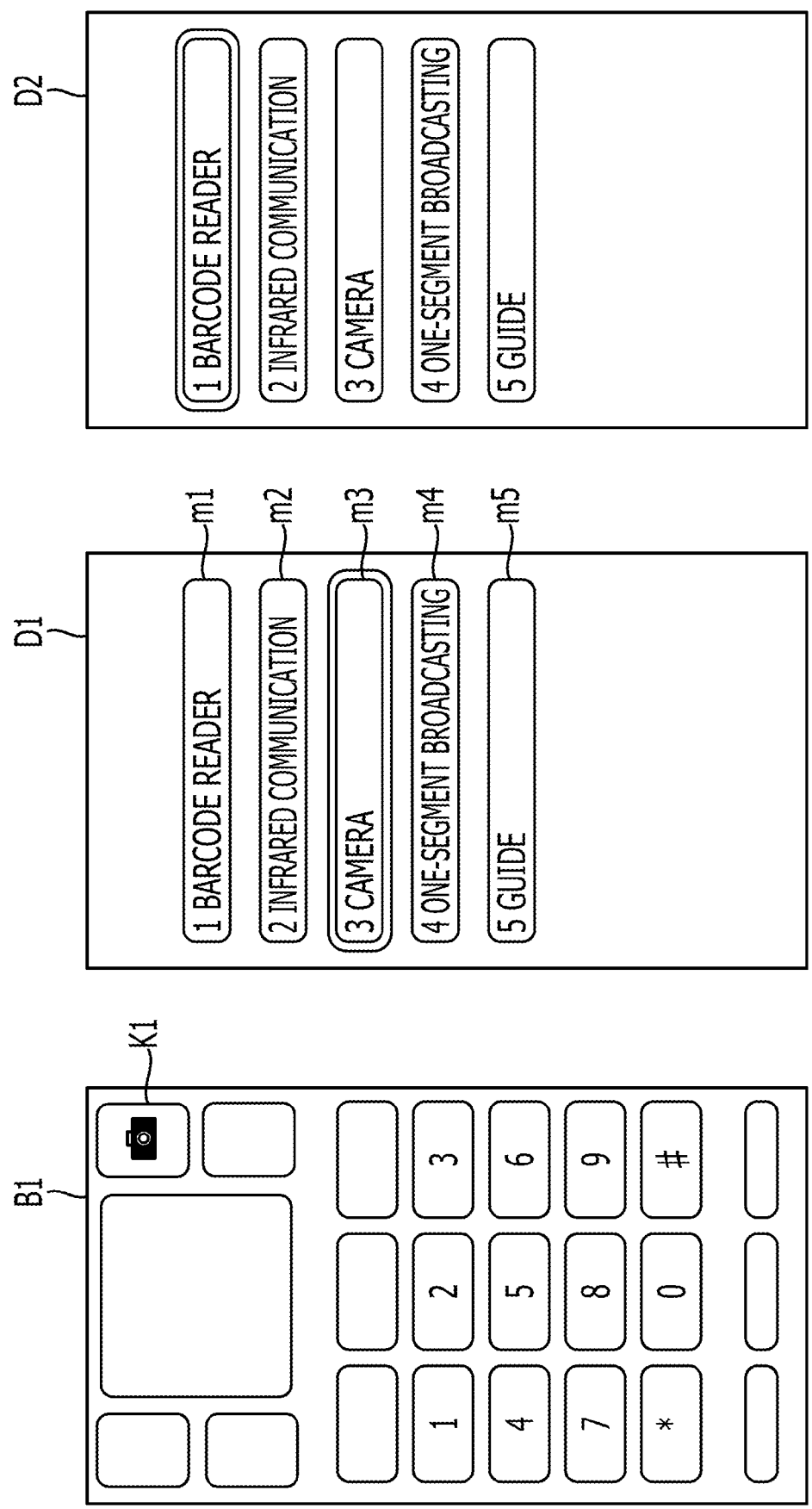
FIG. 5 is an illustration of selection and start of a function based on an input of a user.

For example, a user selects and starts either the picture capturing function or the code reading function of the camera 10b which performs picture capturing and code reading. FIG. 5 is an illustration of selection and start of a function based on an input of a user.

A keyboard B1 shown in FIG. 5 is an example of the input unit 27 included in the camera 10b. When the user presses a key k1 provided on the keyboard B1, the user can start the picture capturing function.

As shown in a display example D1, it is possible to display a menu screen, and the user can select a function from the functions displayed on the menu screen D1. In the display example D1 shown in FIG. 5, five menus are displayed which are barcode reader m1, infrared communication m2, camera m3, one-segment broadcasting m4, and guide m5, and a state is displayed in which the user selects the camera m3.

Similarly, as shown in a display example D2, the user can start the code recognition function by selecting the barcode reader m1 from the menu screen.

In an example shown in FIG. 5, it is assumed that the picture capturing function is more often used than the code recognition function, so that the dedicated key k1 for capturing picture is provided. Therefore, the user can quickly start the picture capturing function by a less operation. On the other hand, a menu operation is required to start the code recognition, so that the number of steps to start the code recognition is greater than that to start the picture capturing.

If the image processing circuit 25 outputs and displays a captured picture and performs the code recognition in parallel, the starts of the picture capturing function and the code recognition function can be integrated together, so that the user need not select and start the functions. However, when the starts of the picture capturing function and the code recognition function are integrated together, the focusing becomes a problem.

When capturing a picture, usually, an image of a subject in a distance range between 1 m to infinity is captured. For example, a film with a lens captures images located in this range. On the other hand, in the code recognition, usually, an image at a distance of about 10 cm is read.

Therefore, there is a problem that the focusing cannot be performed by only adding a code reading operation to a normal picture capturing operation. Therefore, when performing the code reading, an operation, in which the image capturing mode is switched to the macro photography mode by a user operation, may be required.

Figure 6:
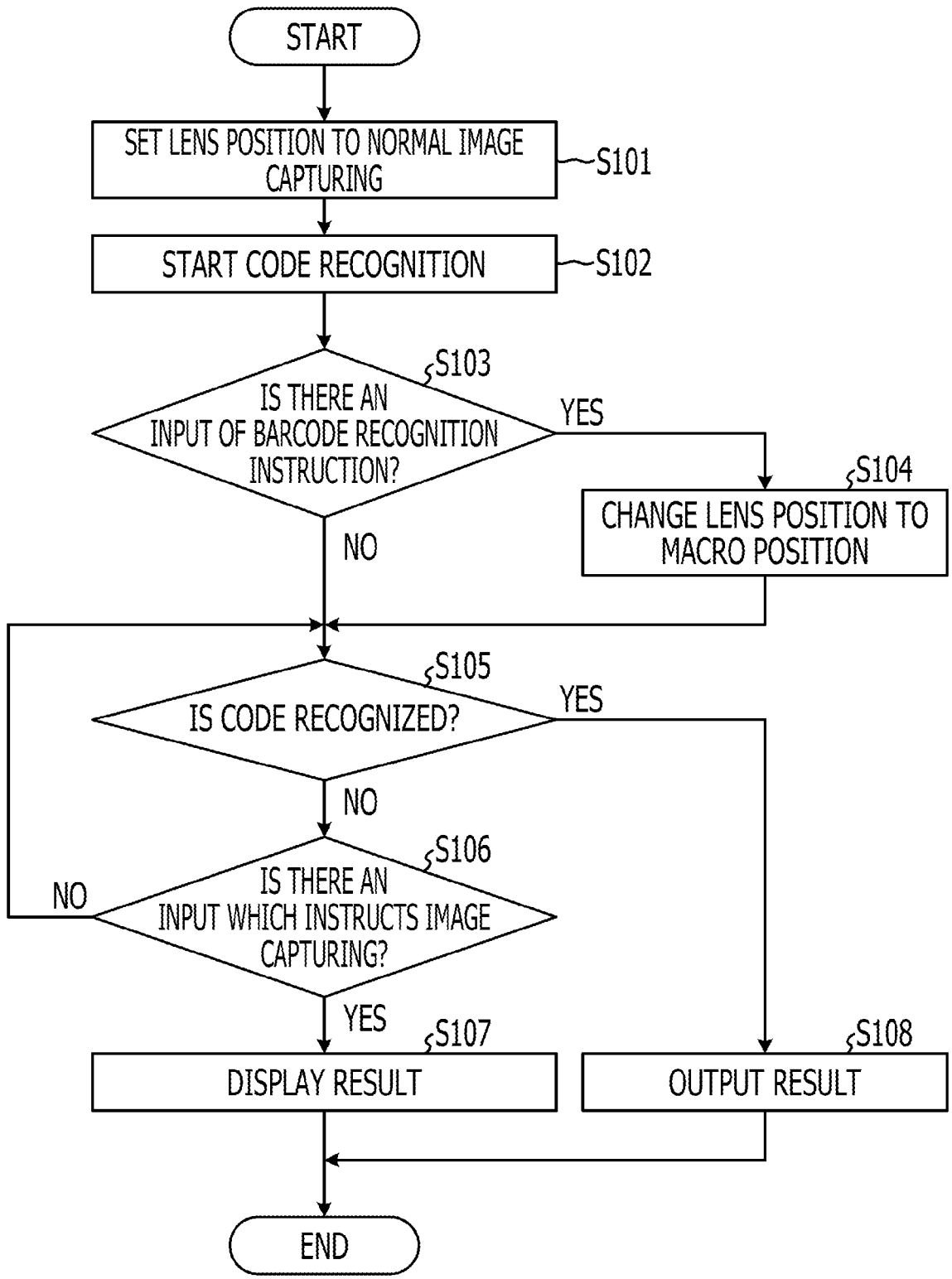
FIG. 6 is a flowchart for explaining a processing operation of a comparative example in which image capturing mode is switched to a macro photography mode by a user operation.

FIG. 6 is a flowchart for explaining a processing operation of a comparative example in which the image capturing mode is switched to the macro photography mode by a user operation. When the camera 10b is started, first, the camera 10b sets the lens to a position suitable to normal picture capturing (step S101) and starts the code recognition (step S102).

When the camera 10b receives an input of a barcode recognition instruction from a user (step S103, Yes), the camera 10b changes the lens position to a position suitable to the macro photography (step S104).

When the camera 10b does not receive an input of a barcode recognition instruction (step S103, No), or after the camera 10b changes the lens position to the macro photography position (step S104), the camera 10b performs the code recognition while outputting and displaying an obtained image (step S105).

As a result of the code recognition, when the camera 10b recognizes a code (step S105, Yes), the camera 10b outputs and displays the recognition result (step S108) and ends the processing. On the other hand, when the camera 10b does not recognize a code (step S105, No), the camera 10b determines whether or not a user's input which instructs image capturing is received (step S106).

If a user's input which instructs image capturing is not received (step S106, No), the camera 10b returns to the code recognition (step S105). If a user's input which instructs image capturing is received (step S106, Yes), the camera 10b outputs the result of the image capturing (step S107), and ends the processing.

As described above, in the configuration of the comparative example, even if the starts of the picture capturing function and the code recognition function are integrated together, a user operation for switching to the macro photography mode is required when performing the code recognition. Different from the comparative example, the camera 11 according to the first embodiment performs display output processing for the picture capturing and the code recognition processing in parallel, and operates a focusing mechanism at the same time according to the stillness of the camera 11. Therefore, it is possible to perform the code recognition without losing usability of a normal camera, so that a function with high convenience can be provided.

Processing Operation

Figure 7:
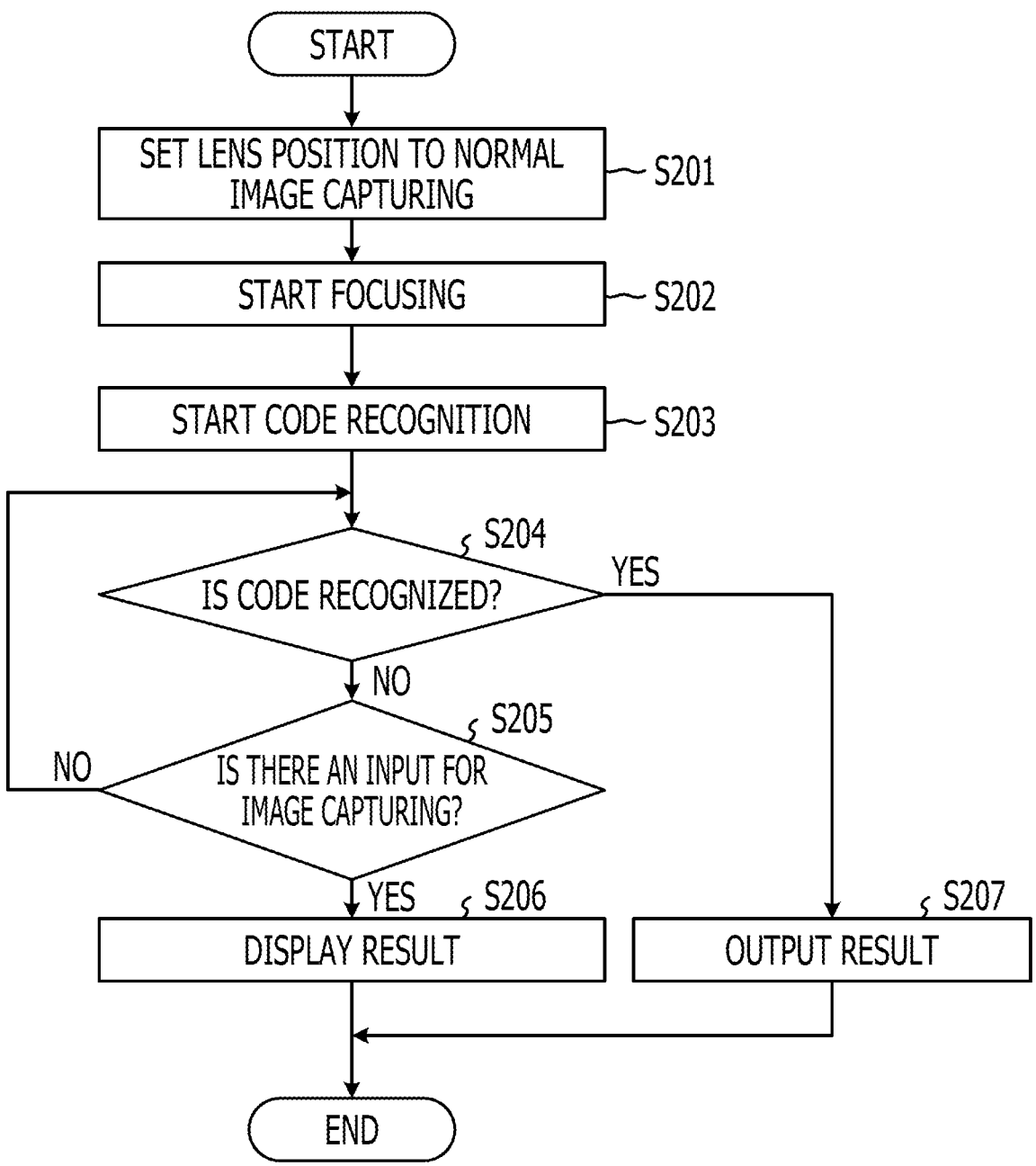
FIG. 7 is a flowchart for explaining a processing operation of the camera according to the first embodiment.

FIG. 7 is a flowchart for explaining a processing operation of the camera 11 according to the first embodiment. When the camera 11 is started, first, the focusing unit 34 of the camera 11 sets the lens to a position suitable to normal picture capturing (step S201) and starts focusing processing (step S202). The code recognition processing unit 32 starts the code recognition (step S203).

When the code recognition processing unit 32 recognizes a code (step S204, Yes), the display processing unit 31 outputs and displays the recognition result (step S207) and ends the processing. For example, the display processing unit 31 outputs and displays a recognized code and a character string corresponding to the code. If the character string is a URL, it is possible that a web page corresponding to the URL is downloaded from a server on the Internet and the web page is outputted and displayed. On the other hand, when the code recognition processing unit 32 does not recognize a code as a result of the code recognition (step S204, No), the recording processing unit 33 of the camera 11 determines whether or not a user's input which instructs image capturing is received (step S205).

If a user's input which instructs image capturing is not received (step S205, No), the camera 11 returns to the code recognition (step S204). If a user's input which instructs image capturing is received (step S205, Yes), the camera 11 records the image and outputs the result of the image capturing (step S206), and then ends the processing.

Figure 8:
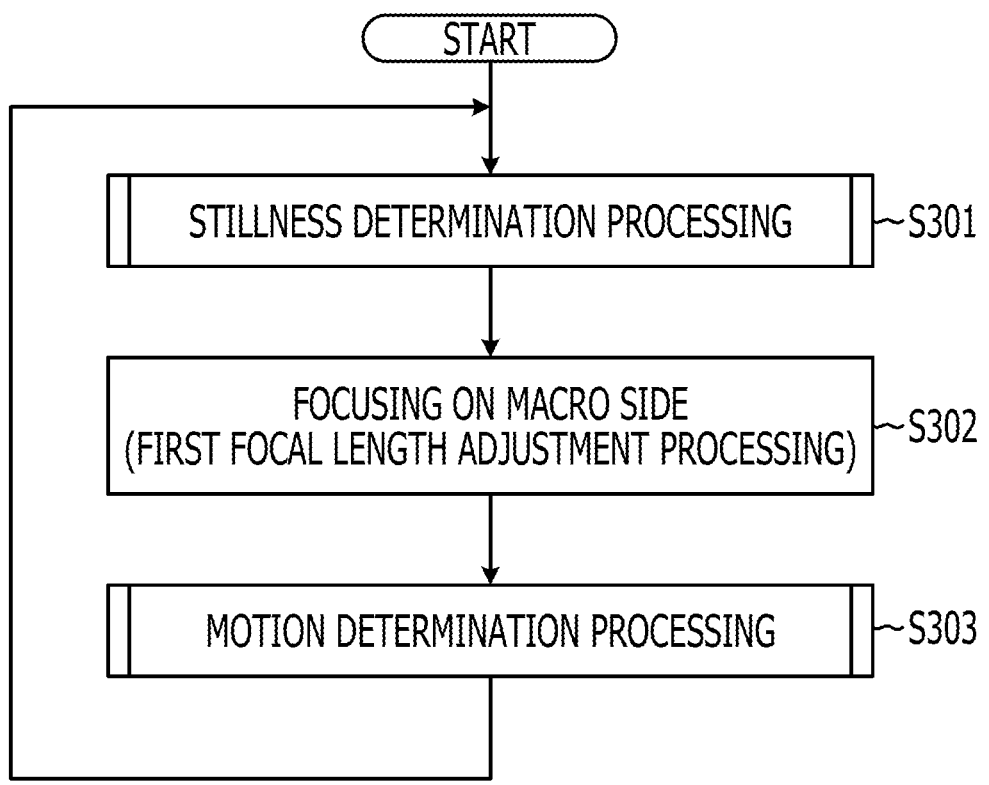
FIG. 8 is a flowchart for explaining focusing processing started from step S202.

FIG. 8 is a flowchart for explaining the focusing processing started from step S202. As shown in FIG. 8, first, the stillness determination unit 35 performs stillness determination processing by using an output of the acceleration sensor 26 (step S301). As a result of the stillness determination processing, when the camera 11 is determined to be in a still state, the focusing unit 34 performs the first focal length adjustment processing which focuses on the macro photography side (step S302).

After the first focal length adjustment processing (step S302), the stillness determination unit 35 performs motion determination processing by using an output of the acceleration sensor 26 (step S303). As a result of the motion determination processing, if it is determined that the camera 11 has moved, the stillness determination unit 35 moves to the stillness determination processing (step S301) again.

Figure 9:
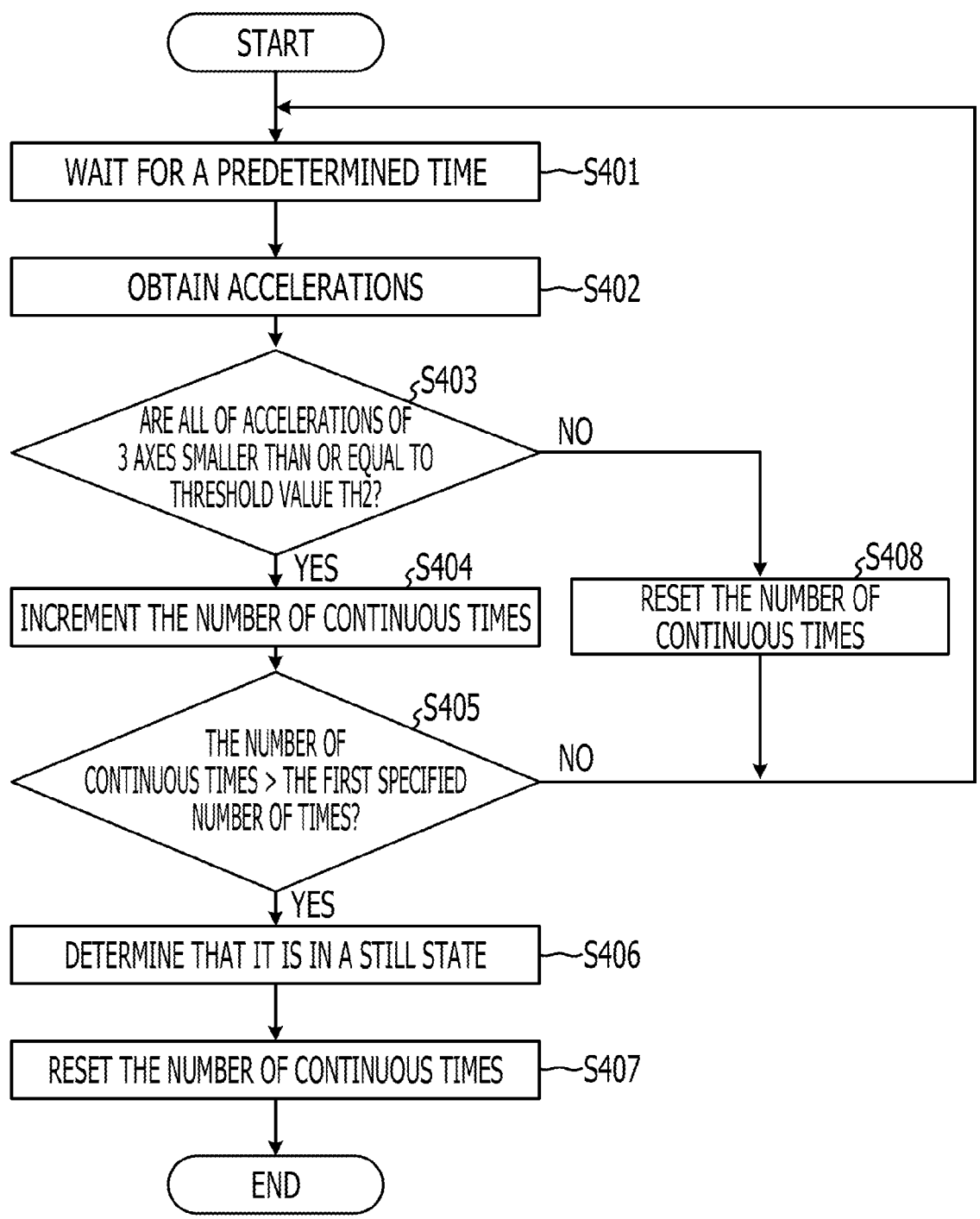
FIG. 9 is a flowchart of stillness determination processing shown in step S301.

FIG. 9 is a flowchart of the stillness determination processing shown in step S301. As shown in FIG. 9, when the stillness determination unit 35 starts the stillness determination processing, the stillness determination unit 35 waits for a predetermined time (step S401), and then obtains accelerations from the acceleration sensor 26 (step S402).

When any one of the accelerations of x axis, y axis, and z axis is greater than a threshold value Th2 (step S403, No), the stillness determination unit 35 resets the number of continuous times (step S408), and returns to step S401.

On the other hand, when all of the three accelerations are smaller than or equal to the threshold value Th2 (step S403, Yes), the stillness determination unit 35 increments the number of continuous times (step S404), and determines whether or not the number of continuous times exceeds a first specified number of times (step S405).

If the number of continuous times is smaller than or equal to the first specified number of times (step S405, No), the stillness determination unit 35 returns to step S401. When the number of continuous times exceeds the first specified number of times (step S405, Yes), the stillness determination unit 35 determines that the camera 11 is in a still state (step S406), resets the number of continuous times (step S407), and ends the stillness determination processing.

Figure 10:
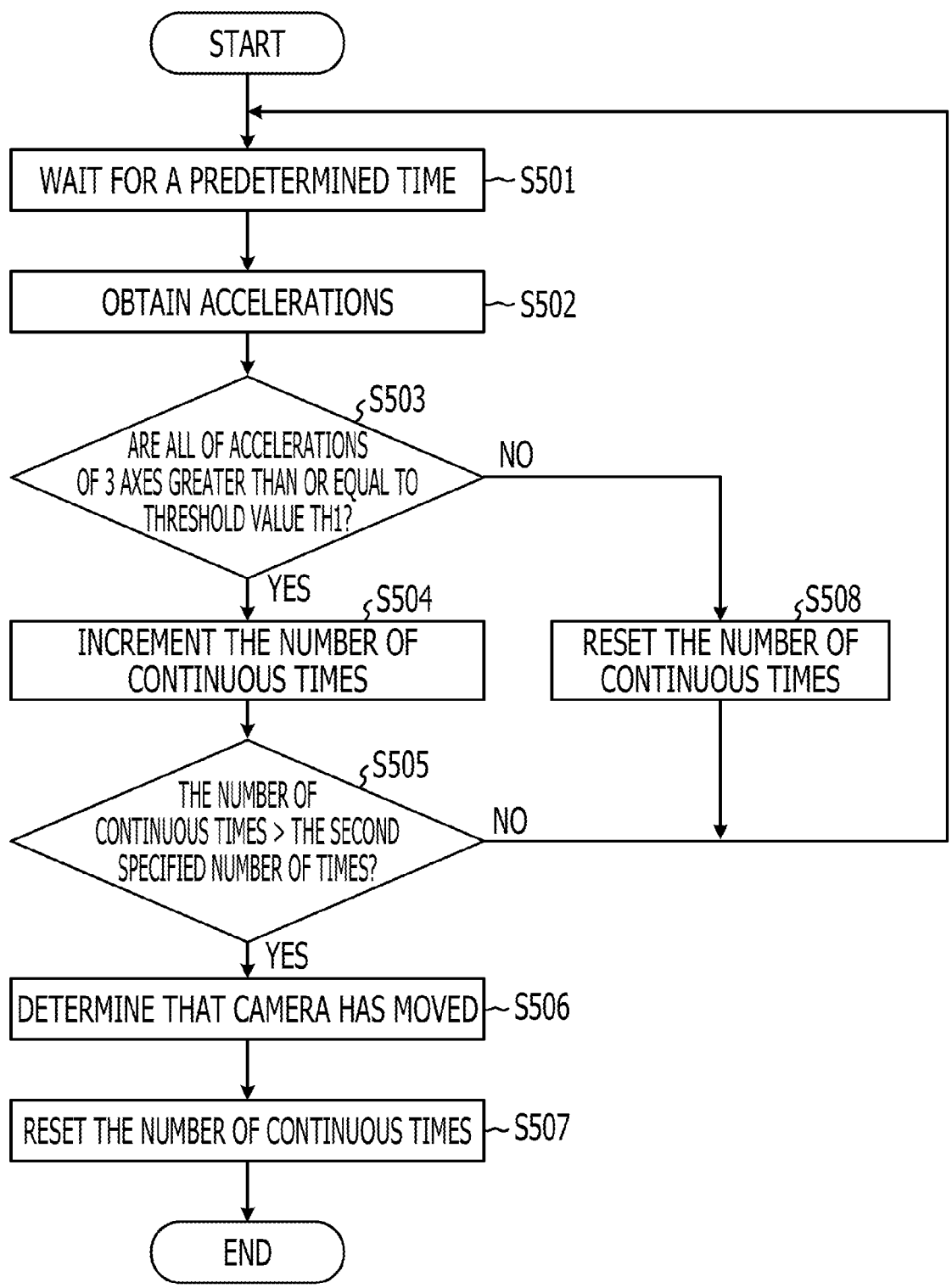
FIG. 10 is a flowchart of motion determination processing shown in step S303.

FIG. 10 is a flowchart of the motion determination processing shown in step S303. As shown in FIG. 10, when the stillness determination unit 35 starts the motion determination processing, the stillness determination unit 35 waits for a predetermined time (step S501), and then obtains accelerations from the acceleration sensor 26 (step S502).

When any one of the accelerations of x axis, y axis, and z axis is smaller than a threshold value Th1 (step S503, No), the stillness determination unit 35 resets the number of continuous times (step S508), and returns to step S501.

On the other hand, when all of the three accelerations are greater than or equal to the threshold value Th1 (step S503, Yes), the stillness determination unit 35 increments the number of continuous times (step S504), and determines whether or not the number of continuous times exceeds a second specified number of times (step S505).

If the number of continuous times is smaller than or equal to the second specified number of times (step S505, No), the stillness determination unit 35 returns to step S501. When the number of continuous times exceeds the second specified number of times (step S505, Yes), the stillness determination unit 35 determines that the camera 11 has moved (step S506), resets the number of continuous times (step S507), and ends the motion determination processing.

Here, processing in which the number of continuous times is incremented when all of the accelerations of three axes are greater than or equal to the threshold value Th1 is described as an example. However, when any one of the accelerations of the three axes is greater than or equal to the threshold value Th1, the stillness determination unit 35 may move to step S504, and when all of the accelerations of the three axes are smaller than the threshold value Th1, the stillness determination unit 35 may move to step S508.

In this way, the camera 11 adjusts the focal length in a direction of macro photography when the camera 11 is in a still state, in other words, in a state where the user has determined an image to be captured and the camera 11 is in a stable state. Therefore, the camera 11 can quickly perform focusing and recognize a code without requiring a user's input even when the subject is a code and the distance between the camera 11 and the subject is short. Therefore, it is possible to provide a function with high convenience, in which, when recognizing a code, the code can be recognized only by causing the camera to face the code, without losing usability of a normal camera.

If the camera 11 moves after the camera 11 is in a still state and the focusing is performed, the focusing is performed again when the camera 11 is in a still state again, so that it is possible to appropriately perform focusing when the user has determined an image to be captured.

In addition to the first focal length adjustment processing which adjusts the focal length in the direction for close-up photography, it is possible to use in parallel second focal length adjustment processing which searches for a focal length appropriate for the image capturing by alternately adjusting the focal length in a direction for capturing a distant image and in a direction for macro photography.

Figure 11:
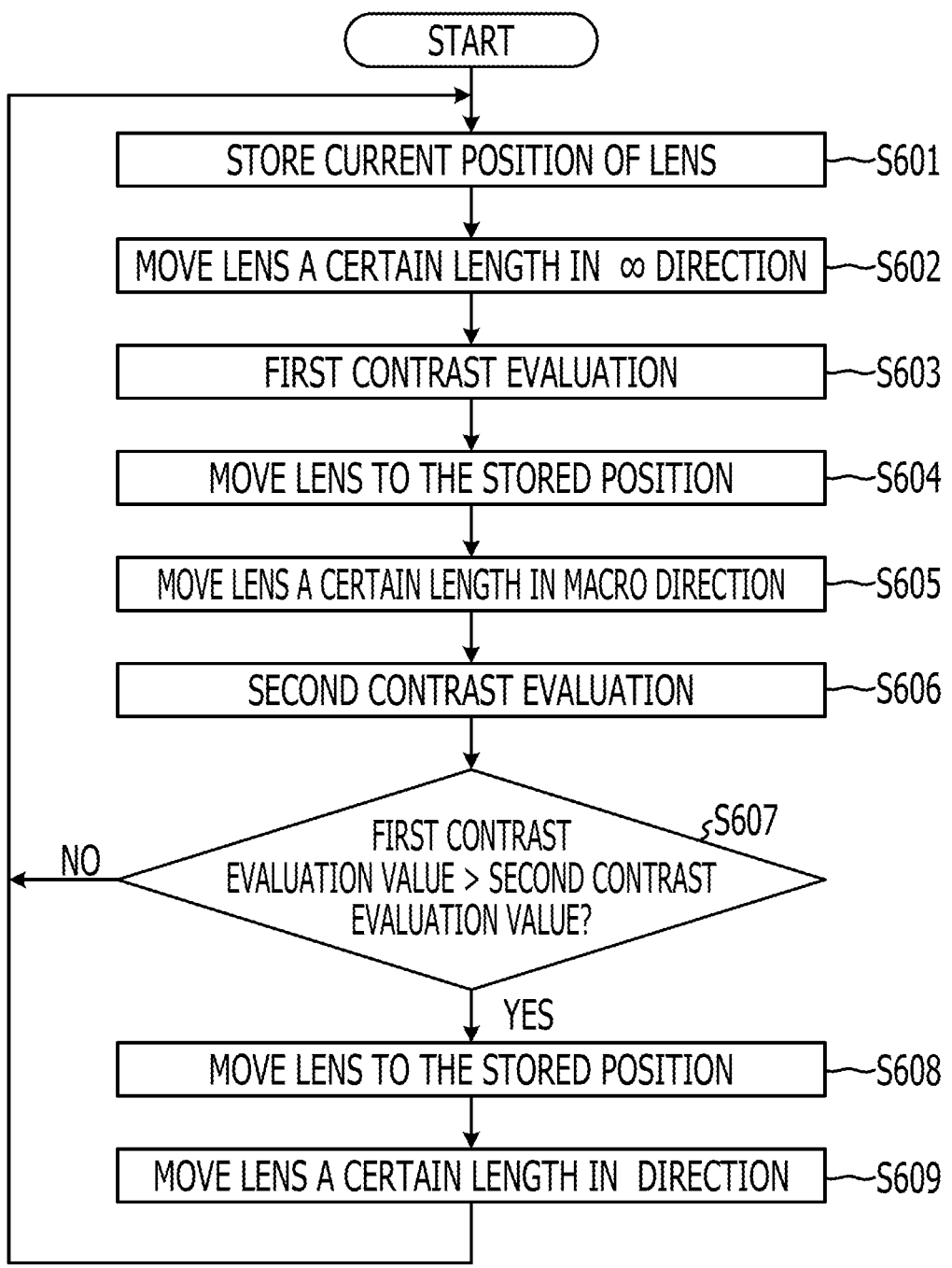
FIG. 11 is a flowchart for explaining second focal length adjustment processing.

FIG. 11 is a flowchart for explaining the second focal length adjustment processing. In the second focal length adjustment processing shown in FIG. 2, first, the focusing unit 34 stores a current position of the lens (step S601), and moves the lens a certain length in ∞ direction, that is, in a direction for capturing a distant image (step S602).

The focusing unit 34 performs first contrast evaluation in this state (step S603), moves the lens to the stored position (step S604), moves the lens a certain length in the direction for macro photography (step S605), and performs second contrast evaluation (step S606).

The focusing unit 34 compares a first contrast evaluation value and a second contrast evaluation value (step S607), and if the first contrast evaluation value is smaller than or equal to the second contrast evaluation value (step S607, No), the focusing unit 34 returns to step S601. If the first contrast evaluation value is greater than the second contrast evaluation value (step S607, Yes), the focusing unit 34 moves the lens to the stored position (step S608), further moves the lens a certain length in the ∞ direction (step S609), and returns to step S601.

Figure 12:
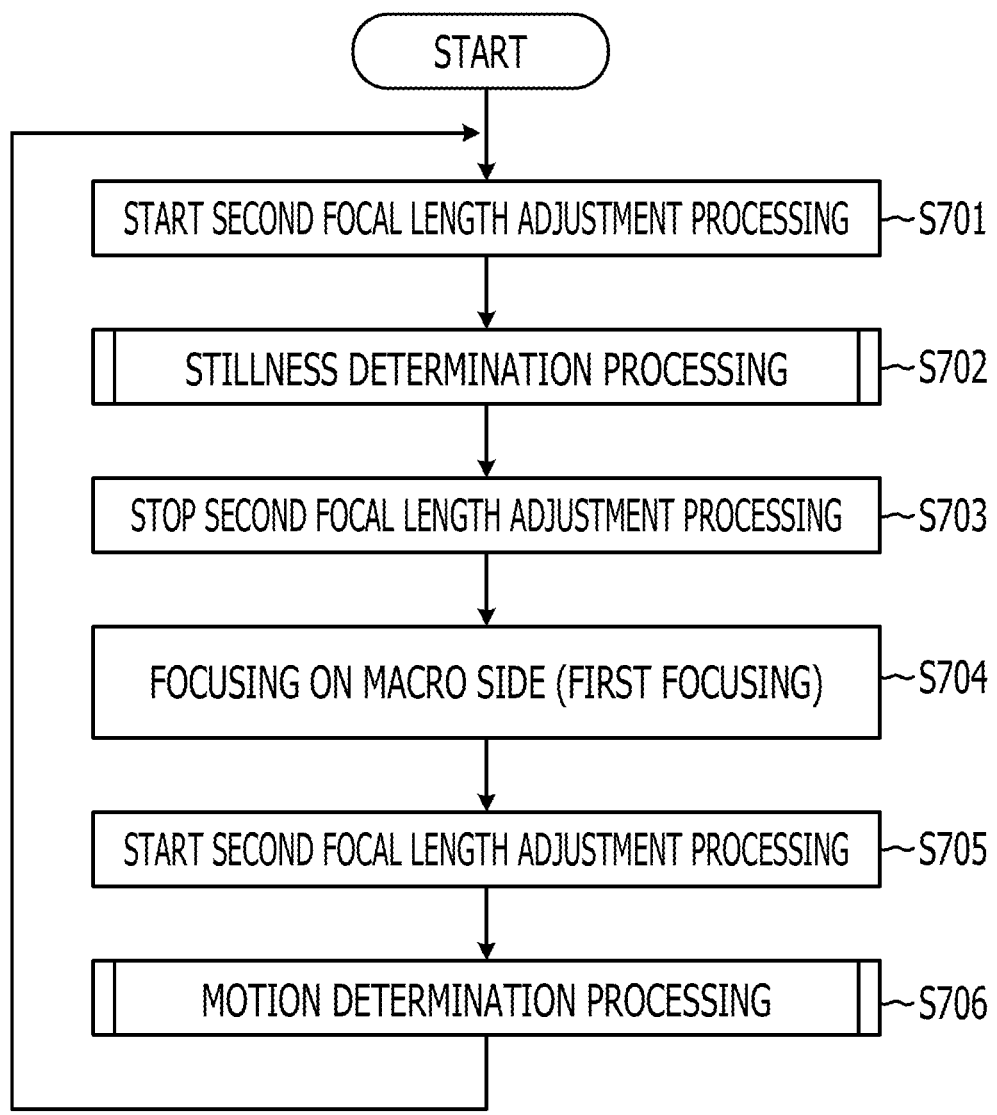
FIG. 12 is a flowchart for explaining focusing processing of the camera when using the second focal length adjustment processing in parallel.

FIG. 12 is a flowchart for explaining the focusing processing of the camera 11 when using the second focal length adjustment processing in parallel. The camera 11 executes the flowchart shown in FIG. 12 instead of the flowchart shown in FIG. 8.

In the focusing processing shown in FIG. 12, first, the focusing unit 34 starts the second focal length adjustment processing (step S701). The stillness determination unit 35 performs stillness determination processing by using an output of the acceleration sensor 26 (step S702). As a result of the stillness determination processing, when the camera 11 is determined to be in a still state, the focusing unit 34 stops the second focal length adjustment processing (step S703) and performs the first focal length adjustment processing (step S704).

After the first focal length adjustment processing (step S704), the focusing unit 34 starts the second focal length adjustment processing (step S705), and the stillness determination unit 35 performs motion determination processing by using an output of the acceleration sensor 26 (step S706). As a result of the motion determination processing, if it is determined that the camera 11 has moved, the stillness determination unit 35 moves to the stillness determination processing (step S702) again.

In the second focal length adjustment processing, the focal point is detected by moving the lens in the direction for capturing a distant image and in the direction for close-up photography, in other words, by moving the lens back and forth. Therefore, even though this is effective for a normal picture capturing operation, it takes a long time to move the lens from the ∞ position to the macro position. In other words, it may take a long time to move the lens from a lens initial position (about 1 m to ∞) suitable for normal image capturing to a lens position (10 cm) suitable for capturing an image of barcode.

Therefore, as shown in FIG. 12, by using the stillness determination processing and a combination of the first focal length adjustment processing and the second focal length adjustment processing, when the camera 11 is in a still state, it is possible to quickly focus on the macro side by the first focal length adjustment processing and recognize a code.

Figure 13:
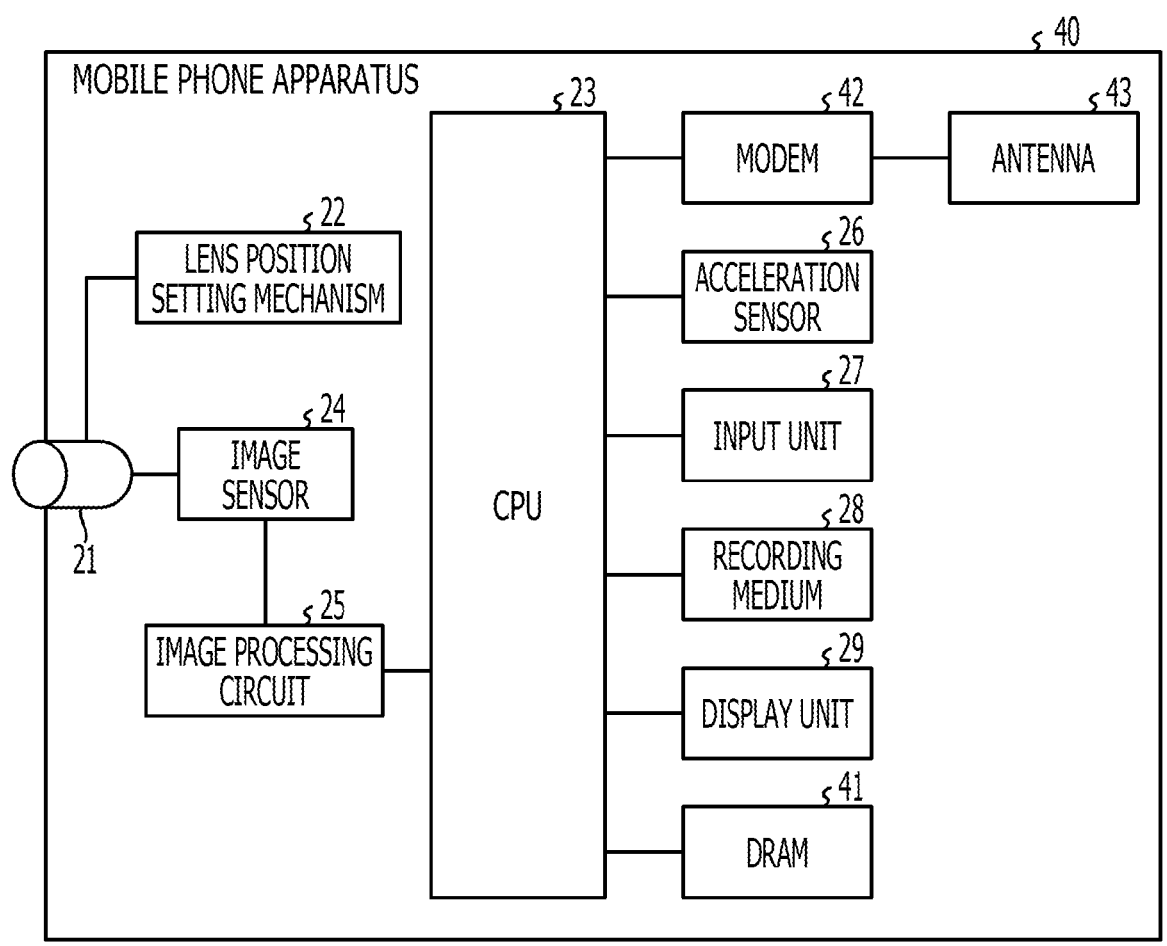
FIG. 13 is a configuration diagram in which the image capturing apparatus according to the embodiment is applied to a mobile phone apparatus.

FIG. 13 is a configuration diagram in which the image capturing apparatus according to this embodiment is applied to a mobile phone apparatus. A mobile phone apparatus 40 includes the lens 21, the lens position setting mechanism 22, the CPU (Central Processing Unit) 23, the image sensor 24, the image processing circuit 25, the acceleration sensor 26, the input unit 27, the recording medium 28, and the display unit 29. In addition to the above, the mobile phone apparatus 40 includes a DRAM (Dynamic Random Access Memory) 41, a modem 42, and an antenna 43.

The CPU 23 executes various programs by using the DRAM 41 as a main storage device. Therefore, when the CPU 23 executes an image capturing program, the CPU 23 can realize functions of the display processing unit 31, the code recognition processing unit 32, the recording processing unit 33, the focusing unit 34, and the stillness determination unit 35. When the CPU 23 executes a communication program, the CPU 23 can wirelessly connect to a mobile phone communication network via the modem 42 and the antenna 43 and perform a telephone call and communication.

As described above, the image capturing apparatus, the image capturing method, and the image capturing program according to this embodiment operate the image capturing function of pictures and moving images and the code recognition function in parallel, determine the motion of the apparatus from accelerations, and perform focusing in the macro direction when the apparatus is in a still state. Therefore, the image capturing apparatus, the image capturing method, and the image capturing program according to this embodiment can perform picture capturing and barcode reading by an easy operation.

Although, in the first embodiment, the camera 11 and the mobile phone apparatus 40 are described as examples, the disclosed technique can be applied to any apparatus which includes an image capturing unit that can adjust the focal length and a means capable of detecting the motion of the apparatus, such as an acceleration sensor.

Second Embodiment

Configuration of Apparatus

Figure 14:
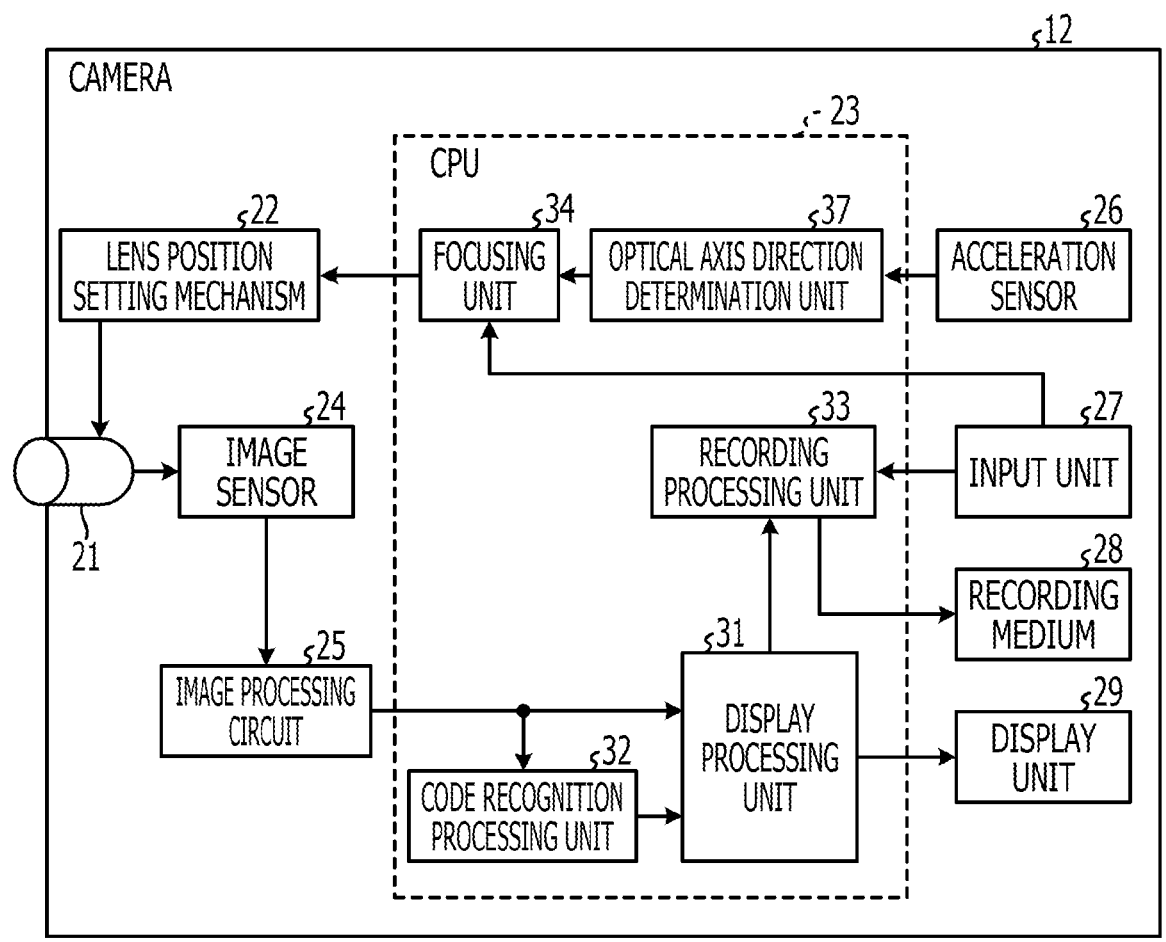
FIG. 14 is a configuration diagram of a camera that is an image capturing apparatus according to a second embodiment.

FIG. 14 is a configuration diagram of a camera 12 that is an image capturing apparatus according to a second embodiment. The camera 12 shown in FIG. 14 includes the lens 21, the lens position setting mechanism 22, the CPU 23, the image sensor 24, the image processing circuit 25, the acceleration sensor 26, the input unit 27, the recording medium 28, and the display unit 29.

Since the lens 21, the lens position setting mechanism 22, the image sensor 24, the image processing circuit 25, the acceleration sensor 26, the input unit 27, the recording medium 28, and the display unit 29 are the same as those in the first embodiment, the description thereof will be omitted.

In the camera 12, the CPU 23 functions as the display processing unit 31, the code recognition processing unit 32, the recording processing unit 33, the focusing unit 34, and an optical axis direction determination unit 37. Since the operations of the display processing unit 31, the code recognition processing unit 32, and the recording processing unit 33 are the same as those in the first embodiment, the description thereof will be omitted.

The optical axis direction determination unit 37 is a determination unit that determines an optical axis direction of the lens 21 on the basis of an output of the acceleration sensor 26. The focusing unit 34 sets an initial position of the lens 21 on the basis of the optical axis direction by using the determination result of the optical axis direction determination unit 37.

Description of Processing

Figure 15:
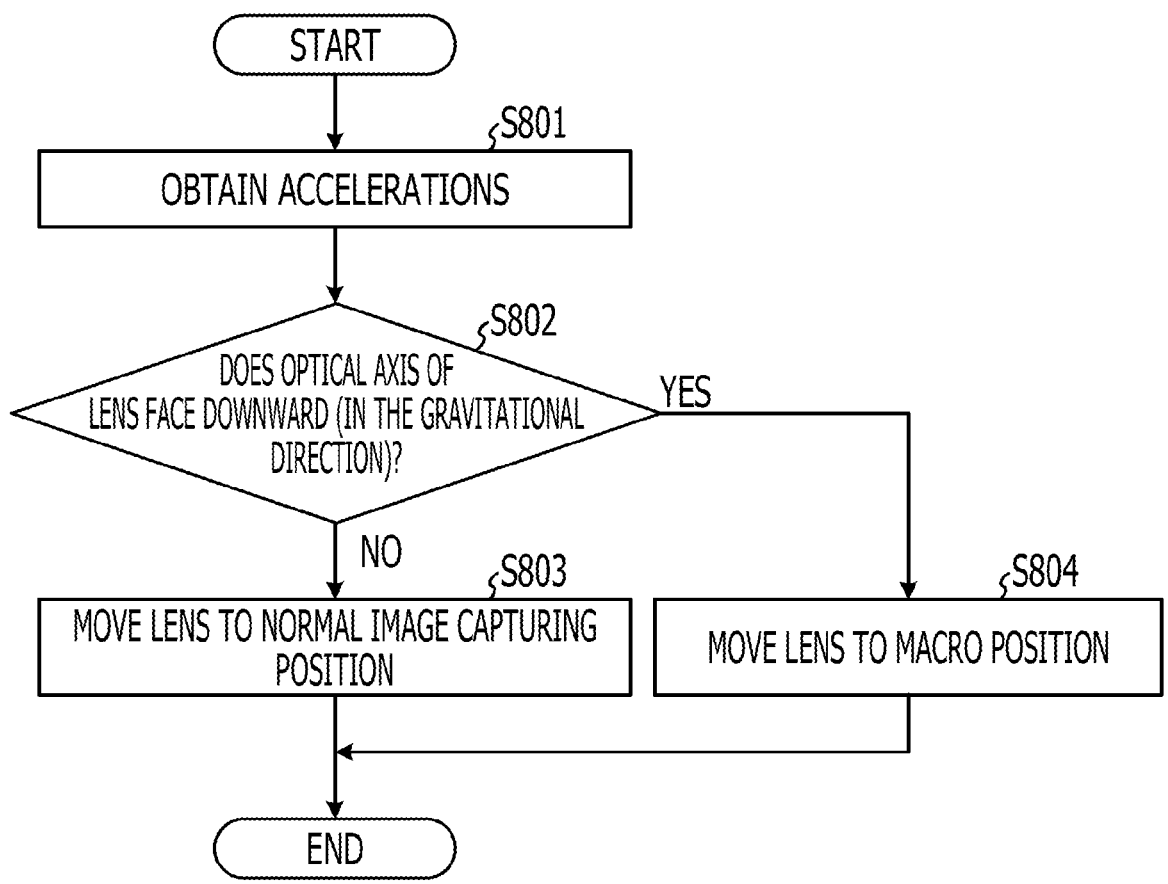
FIG. 15 is a flowchart for explaining a processing operation of the camera according to the second embodiment.

FIG. 15 is a flowchart for explaining a processing operation of the camera 12 according to the second embodiment. When the camera 12 is started, first, the optical axis direction determination unit 37 obtains values of accelerations of the acceleration sensor 26 (step S801) and determines the optical axis direction of the lens 21 (step S802).

When the optical axis direction faces downward (step S802, Yes), the focusing unit 34 moves the lens 21 to an initial position suitable to the macro photography (step S804). On the other hand, when the optical axis direction does not face downward (step S802, No), the focusing unit 34 moves the lens 21 to an initial position suitable to normal picture capturing and moving image capturing (step S803).

Here, whether or not the optical axis direction faces downward may be determined, for example, on the basis of a condition that an acceleration in the gravitational direction is greater than accelerations in other directions by a predetermined vale or the acceleration in the gravitational direction is greater than accelerations in other directions by a predetermined ratio.

When reading a barcode printed on a magazine or a card, it is assumed that, in many cases, the magazine or the card is placed on a desk, a camera is held above the magazine or the card, and the code recognition is performed. Therefore, the camera 12 includes an acceleration sensor, and the posture of the camera 12, that is, the optical axis direction of the lens is determined, so that the initial position of the lens when the camera is started is determined. Specifically, when the optical axis of the lens faces downward (in the gravitational direction), by setting the initial position of the lens to the macro position, it is possible to realize a state in which the barcode is focused from the beginning when the barcode recognition is performed, and the code recognition can be performed quickly.

After setting the initial position of the lens 21 on the basis of the optical axis direction, the focusing can be performed using any technique. As an example, after setting the initial position of the lens 21 disclosed in the second embodiment, the focusing disclosed in the first embodiment may be performed.

As described above, the camera 12 according to this embodiment operates the image capturing function of pictures and moving images and the code recognition function in parallel, determines the posture of the apparatus from accelerations, and sets the initial position of the lens 21. Therefore, the camera 12 according to this embodiment can perform picture capturing and barcode reading by an easy operation.

In the same manner as in the first embodiment, the disclosed technique can be applied to any apparatus, such as a mobile phone apparatus, which includes an image capturing unit that can adjust the focal length and a means capable of detecting the posture of the apparatus, such as an acceleration sensor. This embodiment can be implemented as an image capturing method and an image capturing program in the same manner as the first embodiment.

Third Embodiment

Configuration of Apparatus

Figure 16:
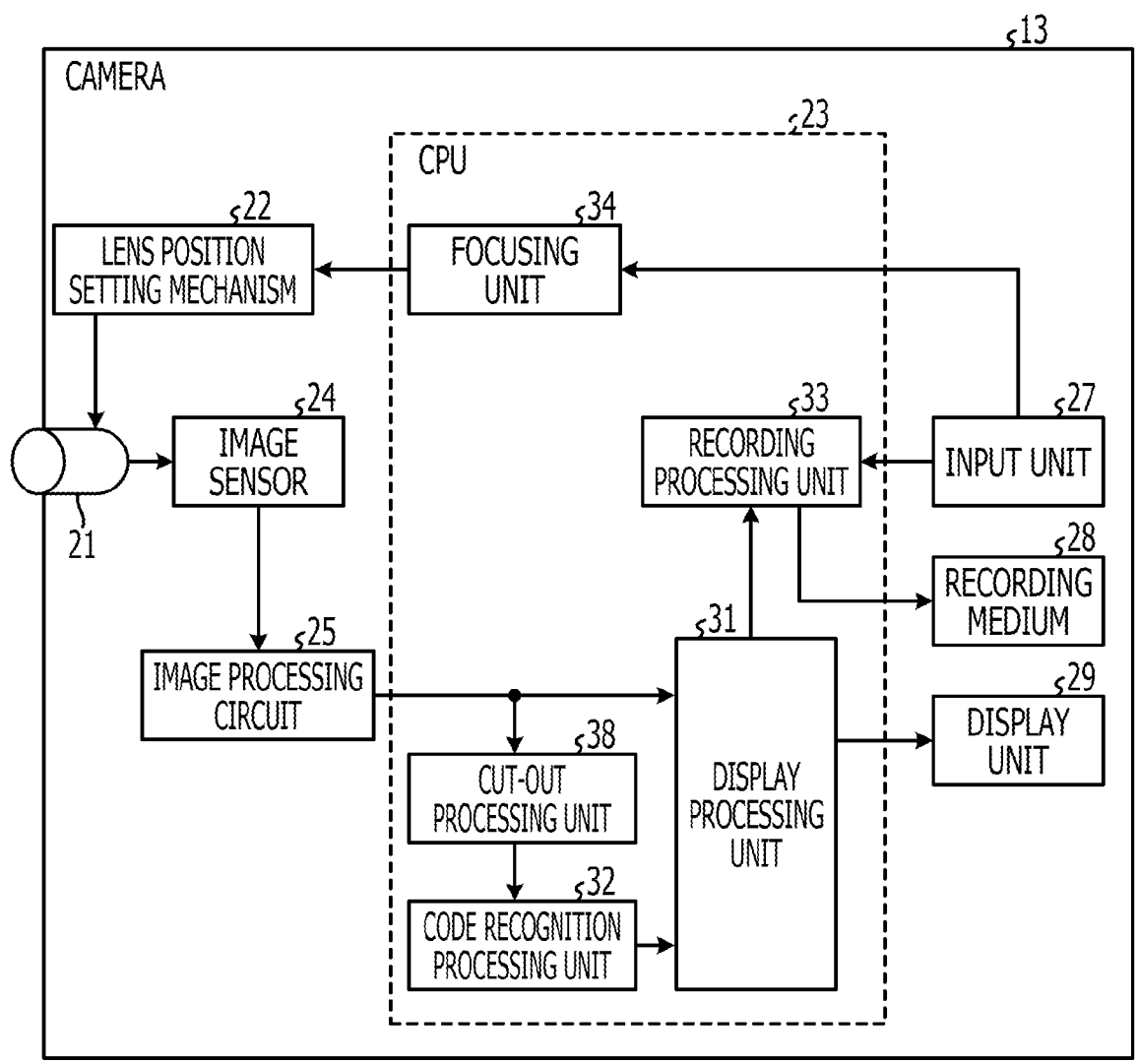
FIG. 16 is a configuration diagram of a camera that is an image capturing apparatus according to a third embodiment.

FIG. 16 is a configuration diagram of a camera 13 that is an image capturing apparatus according to a third embodiment. The camera 12 shown in FIG. 16 includes the lens 21, the lens position setting mechanism 22, the CPU 23, the image sensor 24, the image processing circuit 25, the input unit 27, the recording medium 28, and the display unit 29.

Since the lens 21, the lens position setting mechanism 22, the image sensor 24, the image processing circuit 25, the input unit 27, the recording medium 28, and the display unit 29 are the same as those in the first embodiment, the description thereof will be omitted.

In the camera 13, the CPU 23 functions as the display processing unit 31, the code recognition processing unit 32, the recording processing unit 33, the focusing unit 34, and a cut-out processing unit 38. Since the operations of the display processing unit 31, the code recognition processing unit 32, and the recording processing unit 33 are the same as those in the first embodiment, the description thereof will be omitted.

The cut-out processing unit 38 cuts out a part of an image outputted from the image processing circuit 25 as a partial image and outputs the partial image to the code recognition processing unit 32. Therefore, the code recognition processing unit 32 recognizes a code from the partial image cut out by the cut-out processing unit 38. On the other hand, the output of the image processing circuit 25 is inputted into the display processing unit 31 without passing through the cut-out processing unit 38. Therefore, the display processing unit 31 can output the entire image outputted from the image processing circuit 25 to the display unit 29, and also can capture the entire image outputted from the image processing circuit 25.

Figure 17:
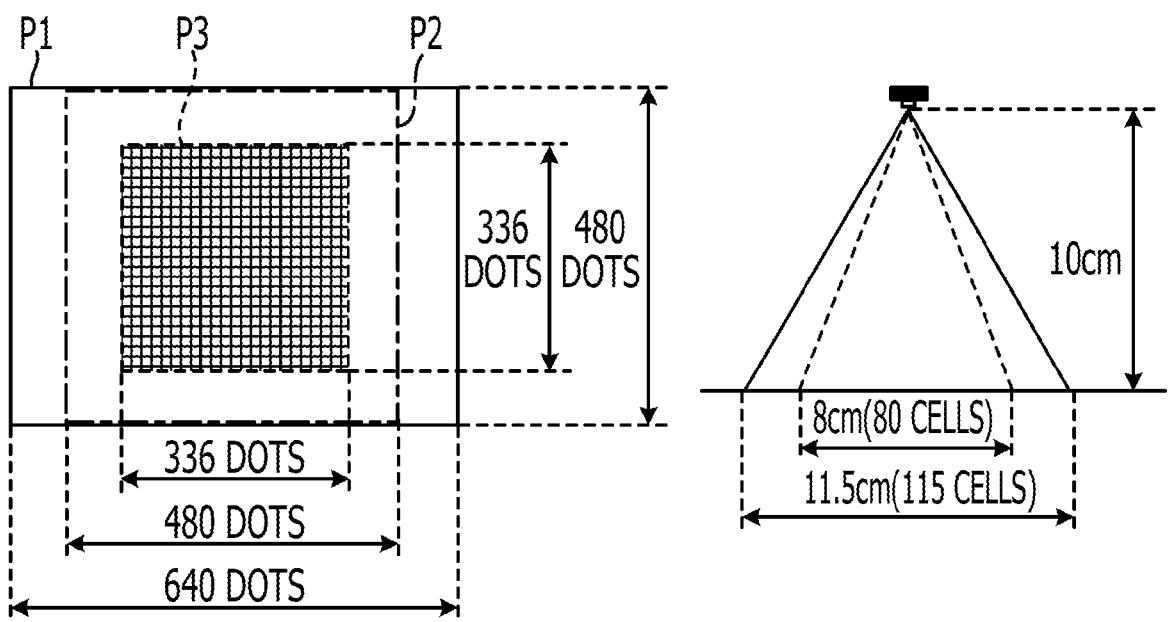
FIG. 17 is an illustration of a specific example of cut-out processing by a cut-out processing unit.

FIG. 17 is an illustration of a specific example of the cut-out processing by the cut-out processing unit 38. A cut-out image that is inputted into the code recognition processing unit 32 is determined considering the angle of view of the camera 13 and the performance of a code recognition engine.

The following is a specific example of image capturing conditions:
(1) Vertical angle of view of the camera: 60 degrees
(2) Image capturing distance of the camera: 10 cm
(3) One cell of a two-dimensional code whose image is captured=1 mm
(4) Performance of the code recognition engine: recognize a two-dimensional code of up to 80 cells×80 cells
(5) Performance of the code recognition engine: it is required that an image of a cell of a two-dimensional code is captured as an image of two dots or more Considering the image capturing under the above-described conditions, as shown in FIG. 17, the camera 13 captures an image of a range of 11.5 cm in the vertical direction due to the conditions (1) and (2).

Due to the condition (3), 115 cells of a two-dimensional code are in a range of 11.5 cm. However, due to a limitation of the condition (4), only up to 80 cells can be recognized. Therefore, it is appropriate that about 70% (80/115) of the vertical angle of view of the camera is inputted into the code recognition engine. In this condition, image of one cell is captured as an image of 4.2 dots, so that the condition (5) is satisfied.

In an example of FIG. 17, an entire image P1 captured by the camera 13 is an image of 640 dots×480 dots. When the two-dimensional code has a square shape, the camera 13 can obtain a two-dimensional code image P2 of up to 480 dots× 480 dots.

Although the 480 dots×480 dots correspond to 115 cells× 115 cells, on the basis of the limitation of the code recognition engine which can recognize up to 80 cells, 70% of 480 dots× 480 dots, that is, an image of 336 dots×336 dots is cut out as a partial image P3, and outputted to the code recognition processing unit 32.

In this way, by reducing the range used for the code recognition to be smaller than a range used for the picture capturing, while the performance of the code recognition engine is fully exerted, the effects described below can be obtained. As an effect, by reducing the range used for the code recognition, a search range is reduced, so that the code recognition can be performed quickly, and the response a user feels can be improved. As another effect, a CPU with a low clock speed can be employed, so that the cost can be reduced. As another effect, the operation clock of the CPU can be reduced, and thus the power consumption of the apparatus can be reduced.

Figure 18:
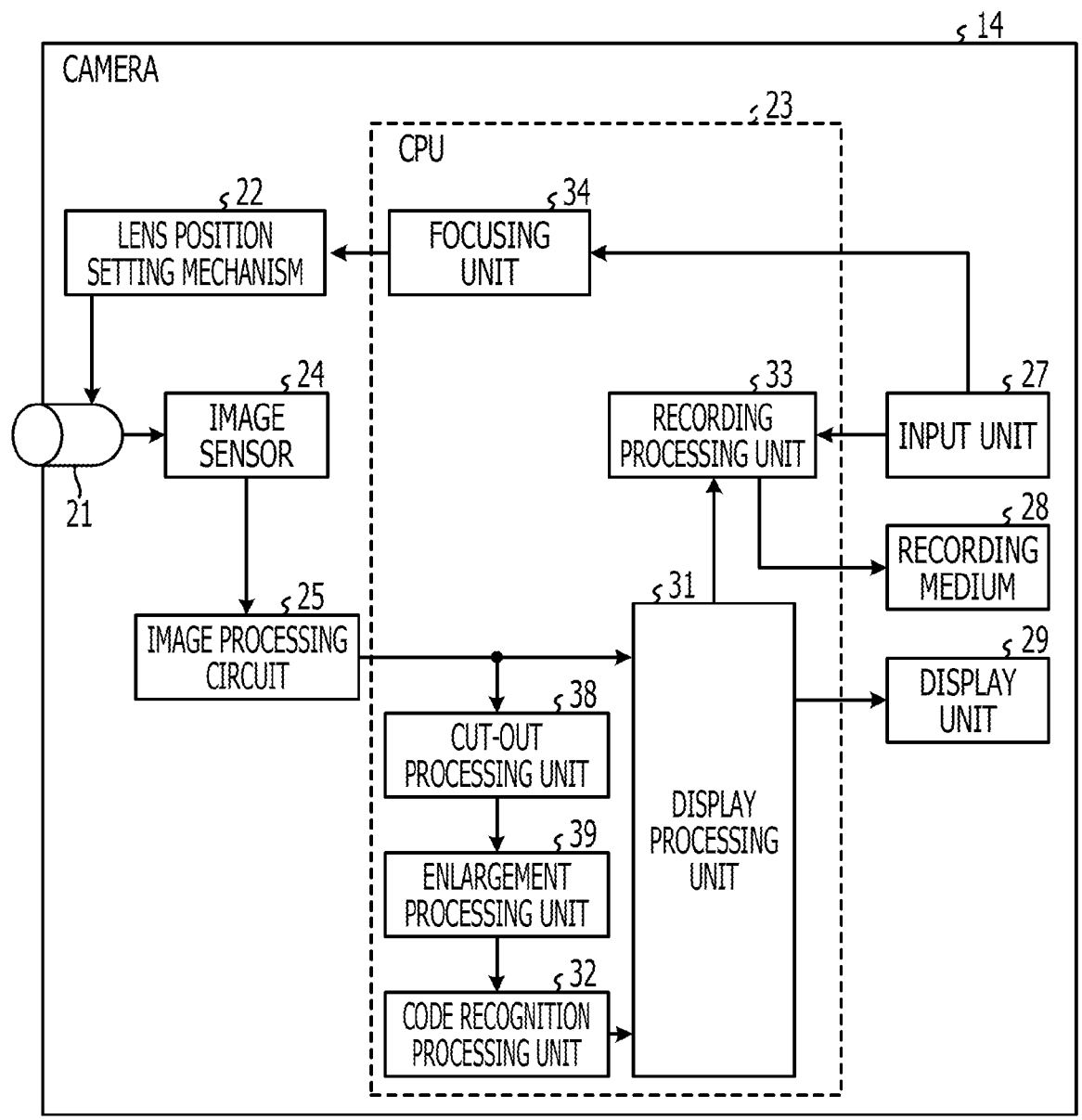
FIG. 18 is a configuration diagram of a camera that enlarges a partial image and performs code recognition.

The cut-out partial image can be enlarged and used for the code recognition. FIG. 18 is a configuration diagram of a camera 14 that enlarges a partial image and performs code recognition. The camera 14 shown in FIG. 18 includes an enlargement processing unit 39 between the cut-out processing unit 38 and the code recognition processing unit 32 of the camera 13. Based on this, the code recognition processing unit 32 recognizes a code from an enlarged partial image. Since the constituent elements other than the above are the same as those in the camera 13 shown in FIG. 16, the description thereof will be omitted.

Figure 19:
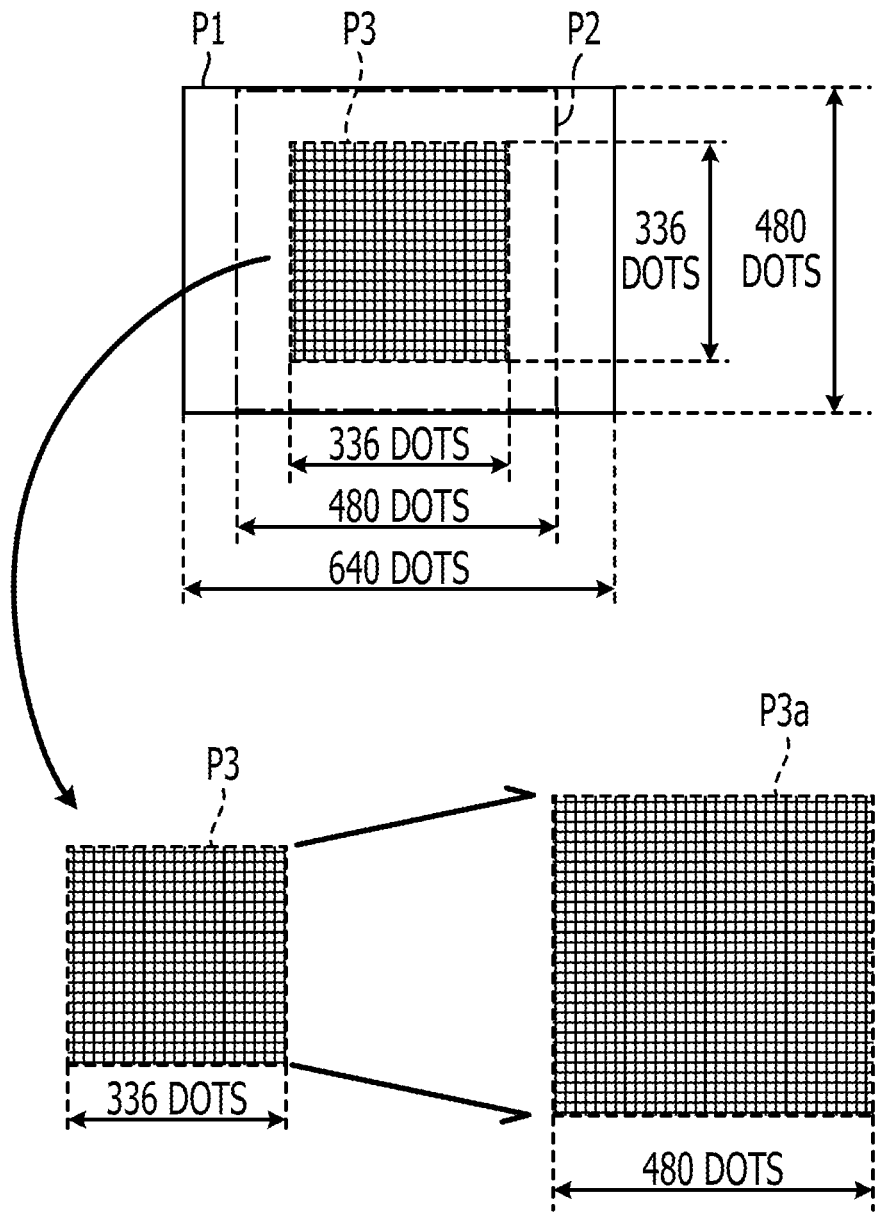
FIG. 19 is an illustration of enlargement of a partial image.

FIG. 19 is an illustration of enlargement of a partial image. As shown in FIG. 19, the cut-out processing unit 38 cuts out the partial image P3 of 336 dots×336 dots from the entire image P1 of 640 dots×480 dots. The enlargement processing unit 39 enlarges the partial image P3 of 336 dots×336 dots to an image of 480 dots×480 dots to create an enlarged partial image P3a, and inputs the enlarged partial image P3a into the code recognition processing unit 32.

The following is a specific example of an image capturing condition:
(1) Vertical angle of view of the camera: 60 degrees
(2) Image capturing distance of the camera: 10 cm
(3) One cell of a two-dimensional code whose image is captured=1 mm
(4) Performance of the code recognition engine: recognize two-dimensional code of up to 80 cells×80 cells
(5) Performance of the code recognition engine: it is required that an image of a cell of a two-dimensional code is captured as an image of 6 dots or more A case in which an image is captured under these conditions is considered. Here, the condition (5) is changed from the condition described above, and the other conditions (1) to (4) are not changed.

In this case, if the enlargement processing is not performed, the image of one cell of the two-dimensional code is captured as an image of 4.2 dots, and thus the code recognition processing unit 32 cannot recognize the code. Therefore, by enlarging the partial image P3 of 336 dots×336 dots to the enlarged partial image P3a of 480 dots×480 dots, one cell is enlarged to an image of 6 dots, so that the code recognition processing unit 32 can recognize the code.

In this way, by reducing the range used for the code recognition to be smaller than a range used for the picture capturing and performing the enlargement processing, it is possible to obtain an effect that a code which cannot be recognized in a conventional manner can be recognized.

As described above, the cameras 13 and 14 according to this embodiment perform the code recognition by cutting out a part of the obtained image in parallel with performing the image capturing function of pictures and moving images. Therefore, the cameras 13 and 14 according to this embodiment can perform picture capturing and high accuracy barcode reading by an easy operation. Also, the cameras 13 and 14 can recognize a code that cannot be recognized in a conventional manner by enlarging a cut-out image.

The size of an image to be cut out, necessity of enlargement, and an enlargement ratio can be properly set and changed on the basis of the performance of the code recognition engine, processing power of the CPU that can be used, a limitation of power consumption, and the length from the camera to the subject. For example, the size of an image to be cut out, the necessity of enlargement, and the enlargement ratio can be changed by using the result of the focusing as the length from the camera to the subject. Also, the size of an image to be cut out, the necessity of enlargement, and the enlargement ratio can be changed on the basis of the remaining buttery power or the CPU usage rate.

The disclosed technique of the cameras 13 and 14 disclosed in this embodiment can be applied to any apparatus, such as a mobile phone apparatus, which includes an image capturing unit that can adjust the focal length. The disclosed technique can be implemented as an image capturing method and an image capturing program. In addition, the disclosed technique can be used in combination with the techniques disclosed in the first and the second embodiments.

The program mentioned above need not necessarily be stored in the ROM and, for example, may be stored into a storage medium such as a memory card and the like and may be read out of the storage medium to be executed. The storage medium comprises all computer-readable storage medium with sole exception being a transitory, propagating signal. The program may be stored into a storage unit of another computer and may be read out of the storage unit via a public line, Internet, a LAN (Local Area Network), a WAN (Wide Area Network) and the like to be executed.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image capturing apparatus comprising:
   a memory; and
   a processor coupled to the memory, configured to adjust a focal length;
   determine whether or not a motion of the image capturing apparatus is within a predetermined range;
   perform a first focal length adjustment processing which adjusts the focal length in a direction for close-up photography when the motion of the image capturing apparatus is within the predetermined range; and
   recognize a code from an image captured by the processor while the first focal length adjustment processing is being performed.

2. The image capturing apparatus according to claim 1, the processor further configured to display information corresponding to the code recognized by the processor.

3. The image capturing apparatus according to claim 1, wherein the processor is further configured to perform second focal length adjustment processing which searches for a focal length appropriate for capturing an image by alternately adjusting the focal length in a direction for capturing a distant image and in a direction for close-up photography, and when the motion of the image capturing apparatus is within a predetermined range, stops the second focal length adjustment processing and performs the first focal length adjustment processing.

4. The image capturing apparatus according to claim 1, the processor further configured to cut out a part of the image captured by the processor as a partial image,
   wherein the processor recognizes a code from the partial image cut out by the processor.

5. The image capturing apparatus according to claim 4, the processor further configured to adjust a partial image cut out by the processor,
   wherein the processor recognizes a code from an image adjusted by the processor.

6. An image capturing method performed by an image capturing apparatus including an image capturing unit having a function for adjusting a focal length, the method comprising:
   determining whether or not a motion of the image capturing apparatus is within a predetermined range;
   performing first focal length adjustment processing which adjusts the focal length in a direction for close-up photography when the motion of the image capturing apparatus is within the predetermined range; and
   recognizing a code from an image captured by the image capturing unit while the first focal length adjustment processing is being performed.

7. A computer-readable recording medium storing an image capturing program in an image capturing apparatus that includes an image capturing unit having a function for adjusting a focal length, the image capturing program when executed instructs the image capturing apparatus to perform processing of:
   determining whether or not a motion of the image capturing apparatus is within a predetermined range;
   performing first focal length adjustment processing which adjusts the focal length in a direction for close-up photography when the motion of the image capturing apparatus is within the predetermined range; and
   recognizing a code from an image captured by the image capturing unit while the first focal length adjustment processing is being performed.

* * * * *